United States Patent [19]

Ammeraal et al.

[11] Patent Number: 5,032,182
[45] Date of Patent: Jul. 16, 1991

[54] BRANCHED CYCLODEXTRINS

[75] Inventors: Robert N. Ammeraal, Worth; Edward D. DeBoer, Sauk Village, both of Ill.

[73] Assignee: American Maize-Products Company, Stamford, Conn.

[21] Appl. No.: 467,804

[22] Filed: Jan. 19, 1990

Related U.S. Application Data

[62] Division of Ser. No. 232,389, Aug. 15, 1988, Pat. No. 4,804,307.

[51] Int. Cl.$^5$ .............................................. C13F 1/04
[52] U.S. Cl. .......................................... 127/63; 127/30
[58] Field of Search ..................... 127/30, 29; 536/103, 536/1.1

[56]           References Cited
U.S. PATENT DOCUMENTS

| 4,303,787 | 12/1981 | Horikoshi et al. | 536/103 |
| 4,668,626 | 5/1987 | Kobayashi et al. | 536/103 |
| 4,781,977 | 11/1988 | Yagi et al. | |
| 4,808,232 | 2/1989 | Beesley et al. | |
| 4,840,679 | 6/1989 | Ammeraal et al. | 127/40 |
| 4,871,840 | 10/1989 | Kobayashi et al. | 536/103 |
| 4,910,137 | 3/1990 | Kobayashi et al. | 536/103 |

OTHER PUBLICATIONS

Kennedy, H. M. et al., "Starch and Dextrin" in: Whistler, R. L. et al., Starch Chemistry and Technology, Academic Press, New York, Second Ed., 1984, pp. 596-599.

Horton, D., "Pyrolysis of Starch," in: Whistler, R. L. et al., Starch Chemistry and Technology, Academic Press, New York, vol. I, 1965, pp. 421-430.

Primary Examiner—Theodore Morris
Assistant Examiner—P. L. Hailey
Attorney, Agent, or Firm—Lucas & Just

[57] ABSTRACT

Branched cyclodextrins are produced by the pyrolysis of cyclodextrins. The temperature range is 135° C. to 220° C. using equipment suitable for making British gum and other starch dextrins.

35 Claims, No Drawings

BRANCHED CYCLODEXTRINS

This is a division of application Ser. No. 232,389 filed Aug. 15, 1988, now U.S. Pat. No. 4,804,307.

This invention relates to a method for producing branched cyclodextrins and especially branched beta cyclodextrins and the product produced thereby.

Starch occurs naturally in a variety of plants such as corn, potato, sorghum and rice and is extracted from portions of the plant by a milling operation which separates the starch from the plant. Physically, the starch is in a granular form which typically comprises both amylose and amylopectin.

Amylose is a straight chained polymer of anhydroglucose units bonded together by 1,4 bonds while amylopectin is a polymer composed of a straight chain of alpha 1,4 anhydroglucose onto which side chains of alpha 1,4 anhydroglucose polymers are bonded. In amylopectin, the bond between the straight chain and the side chain is an alpha 1,6 bond. The amount of amylose and amylopectin in a starch granule depends on the source of the starch. For example, starch obtained from high amylose corn contains about a 50:50 ratio while starch obtained from waxy corn contains about a 99:1 ratio of amylopectin to amylose.

Cyclodextrins, also called Schardingers dextrins, cycloamyloses, cyclomaltoses and cycloglucans, are polymers of anhydroglucose, bonded together by alpha 1,4 bonds to form a ringed compound. A six membered ring is called alpha cyclodextrin; seven, beta cyclodextrin; and eight, gamma cyclodextrin. These six, seven and eight membered rings are also referred to as cyclomaltohexaose, cyclomaltoheptaose and cyclomaltooctaose, respectively.

Branched cyclodextrins were described as early as 1965 by French and his co-workers, see French et al., Archives of Biochem. and Biophys. Volume III, pages 153-160, 1965, but had been studied very little until recently. Branched cyclodextrins, as their name implies, have one or more anhydroglucose units bonded onto the ring structure such that a branch extends out from the ring structure.

Conventionally, branched cyclodextrins are obtained by treating starch slurry high in amylopectin, such as waxy starch, with an enzyme or acid to produce a gelatinized and liquefied starch slurry having a DE between 1 and 5. The gelatinized and liquefied starch slurry is then treated with cyclodextrin glycosyl transferase (CGT), at the appropriate pH, temperature and time for the selected CGT. The enzyme, CGT, is obtained from microorganisms such as *Bacillus macerans, B. magaterium, B. circulans, B. stearothermophilus* and *Bacillus sp.* (alkalophilic) as well as others. The digest from the CGT contains branched cyclodextrins, non-branched cyclodextrins, and acyclic material. This digest typically has a low concentration of branched cyclodextrins. The branched cyclodextrins and cyclodextrins are then typically separated from the digest by a solvent extraction process.

In order to produce predominately beta cyclodextrins and branched beta cyclodextrins, the reaction between CGT and the gelatinized and liquefied starch slurry is conducted under a solvent such as toluene or p-xylene. Such solvents substantially increase the yield of both beta cyclodextrin and branched beta cyclodextrin.

Another method for forming branched cyclodextrins is taught in U.S. Pat. No. 4,668,626 issued May 26, 1987. The '626 patent teaches another enzymatic method for producing branched cyclodextrins.

In both enzymatic treatments to obtain branched cyclodextrins it is thought that the bond between the branch and the cyclodextrin ring is an alpha 1,6 bond, the same bond as between the branches and the main chain in amylopectin.

Applicants have now discovered that branched cyclodextrins are formed by pyrolysis of dried, crystalline cyclodextrins. Applicants have also discovered that the product from such a process, although behaving like branched cyclodextrins formed from enzymatic treatment, are not necessarily the same product as that produced by enzymatic treatment because the bonds formed between the branches and the ring when employing the process of the present invention are not necessarily all alpha 1,6 bonds and the branches are not necessarily all anhydroglucose units.

Applicants found it truly surprising and unexpected that pyrolysis of cyclodextrin formed branched cyclodextrins in spite of the physical and chemical differences between starch granules and cyclodextrin crystals. It was also surprising that these formed before a melt of small carbohydrate molecules resulted. The pyrolysis process was reproducible with cyclodextrins obtained from different processes of manufacture and it was unexpected that the temperature dependence of beta cyclodextrin degradation could be predicted from a linear Arrhenhius plot (activation energy=36 Kcal).

The advantages of the present invention are numerous. First, such a process reduces the cost and greatly simplifies the method of manufacture of branched cyclodextrins. Since cyclodextrins are commercially available, by merely employing an oven and the process of the present invention branched cyclodextrins are produced. A commercial preparative chromatographic column as taught in copending application Ser. No. 232,307 filed concurrently herewith is then preferably employed to separate the branched cyclodextrins from the other cyclodextrins and acyclic dextrins produced by the process of the present invention. The non-reacted cyclodextrins are preferably recovered and recycled. The process of the present invention increases the rate of production and total availability of branched cyclodextrins compared to enzymatic production of branched cyclodextrins.

The advantage of branched cyclodextrins over cyclodextrins and especially branched beta cyclodextrins over beta cyclodextrins is solubility. Under ambient conditions, branched beta cyclodextrins are highly soluble in water, about 60%, while beta cyclodextrins are poorly soluble, about 2%. Branched beta cyclodextrins can readily act as a host for a number of compounds, thereby solubilizing the compounds.

The overall process for producing branched cyclodextrins in accordance with the present invention comprises heating dry, crystalline cyclodextrins to a temperature in the range of about 135° C. to about 220° C. for a period of time sufficient to produce branched cyclodextrins, cooling the product from the heating step and finally separating the branched cyclodextrins from the remaining product. The remaining product contains both cyclodextrins which are unreacted and acyclic dextrins. The unreacted cyclodextrins are preferably separated and recycled to the heating step.

The cyclodextrins are from any source of starch and produced by any process. Cyclodextrins are made in a conventional manner. Good results have been obtained using cyclodextrins produced from potato starch.

Conventionally, cyclodextrins are made by forming an aqueous solution of starch at a concentration up to about 35% by weight solid. The slurry is then subjected to gelatinization and liquefaction by enzyme or acid to a DE from about 1 to about 5. The preferred enzyme for liquefaction is bacterial alpha amylase. Next, a selected CGT is added to the gelatinized and liquefied slurry and the pH, temperature and time of the treatment are adjusted depending on the selected CGT. Generally, the pH is between about 4.5 to about 8.5, and the temperature ranges from ambient to about 75° C. The time of reaction runs for about ten hours to seven days. Cyclodextrins are then separated from solution by precipitation in a conventional manner. Commercial sources of cyclodextrins are available.

Alpha, beta and gamma cyclodextrins are used in the present invention either as a mixture or individually. Preferably, only one type of cyclodextrin is used in the process and the types are not mixed. Good results have been obtained with beta cyclodextrin.

The cyclodextrins must be in the crystalline form and washed free of non-carbohydrate impurities. If the cyclodextrins are not in the crystalline form, they must be crystallized. Crystallization is accomplished in a conventional manner by forming a solution of cyclodextrins and cooling the solution and holding it in a cooled state for about two days. Crystals form from the cooled solution. Then the crystals are washed in a conventional manner to remove the non-carbohydrate impurities.

The moisture content of the dried, crystalline cyclodextrins should be less than or equal to about 15% and is preferably less than about 12%. More preferably, the moisture content is from about 4% to about 7% and good results are obtained at a moisture content of about 5%. Moisture content is determined in a conventional manner.

The crystalline cyclodextrins are preferably free of acyclic dextrins. Pyrolysis of beta cyclodextrin has been attempted in the presence of an acyclic dextrin having a DE of about 5, however, the acyclic dextrin was found not to promote the branching reaction.

As discussed above, preferably the dried, crystallized cyclodextrin, no matter whether it is alpha, beta, or gamma, should be substantially free of the other cyclodextrins, non-carbohydrate materials and acyclic carbohydrate materials. Good results have been obtained with crystalline cyclodextrins having a purity of above about 95% by weight.

Preferably, the size of the crystals should be such that the crystals pass through a 100 mesh screen, however, they should not be so small as to cause a dusting problem.

The pyrolysis should be conducted at a temperature between about 135° to 220° C. A more preferred temperature is about 180° to 190° C. and good results have been obtained at a temperature of about 190° C.

Time for such a reaction depends on the type of equipment employed. Typically, with industrial size equipment that is employed for manufacturing, about 10 to about 20 hours are needed. The process is generally conducted at ambient pressure.

The vessel used to manufacture the branched cyclodextrins in accordance with the present invention is conventional. It should be jacketed to provide good insulation and have a heating means such that the temperature of the cyclodextrins is maintained in the range of the present invention. The vessels used for pyrolysis of starch to produce dextrins conventionally called British gums can be used for the present invention. An alternative method is to spread the cyclodextrins onto a belt and run the belt through an oven for the prescribed time to produce the product of the present invention. Yet another alternative is to spread cyclodextrins onto a pan and place the pan in an oven. For small scale production, good results have been obtained by spreading dried, crystallized cyclodextrins on a pan and placing the pan in an oven at a temperature of about 185° C. to about 200° C. for about 2 to about 4 hours. The cyclodextrins are spread about one inch in depth.

The heating step is conducted in the substantial absence of water as is evident by the moisture content of the cyclodextrins.

After the heating step, the product from the heating step is removed from the heat and allowed to cool. Good results have been obtained by simply spreading the product out on paper and allowing it to cool in ambient conditions to ambient temperature.

Finally, the branched cyclodextrins must be separated from the other components of the process. Any conventional method of separation is employed.

A practical method for separating the branched cyclodextrins from the non-branched cyclodextrins is described in copending application Ser. No. 071,097 filed July 8, 1987. That application is incorporated herein by reference.

Broadly, the '097 application teaches a separation process for separating branched beta cyclodextrins from acyclic and beta cyclodextrins comprising: forming a first precipitate and a first liquor from a first aqueous solution containing branched beta cyclodextrin by the addition of a beta cyclodextrin complexant to the first solution; recovering the first precipitate; forming a second aqueous solution with the first precipitate; forming a second precipitate and a second liquor from the second solution by the addition of a beta cyclodextrin complexant to the second solution; recovering the second liquor; and finally, recovering branched beta cyclodextrins from the second liquor.

Preferably, the branched cyclodextrins are separated from the non-branched cyclodextrins as taught in copending U.S. patent application Ser. No. 232,307 filed concurrently herewith, incorporated herein by reference. This application teaches separating branched cyclodextrins from non-branched cyclodextrins by passing the mixtures through a matrix onto which an inclusion compound has been bound. The branched cyclodextrins and cyclodextrins are sequentially eluted from the column.

Once the branched cyclodextrins are separated from the other components of the product the unreacted cyclodextrins are preferably recycled to the heating step.

The products of the present invention function like branched cyclodextrins produced by enzyme formation, however, it is known that the branches are not all necessarily bound to the ring of the cyclodextrin by alpha 1,6 bonds and it is thought that not all the branches are made up of anhydroglucose units. Typically about 35% of the decomposed cyclodextrins are converted to branched cyclodextrins. The average molecular weight of the product from the process of present invention is about 1800 (four branch sugar units average). A range of molecular weights is present and it was estimated that about 80% of these are below molecular weight 2800 (ten branch sugar units) for the branched beta cyclodextrin.

These and other aspects of the present invention may be more fully understood by reference to the following examples.

EXAMPLE 1

This example illustrates making a branched beta cyclodextrin in accordance with the present invention.

Beta cyclodextrin having 98% purity was made by treating potato starch with an alkalophilic cyclodextrin glycosyl transferase without the use of an organic solvent in a conventional manner. The slurry obtained from this treatment was refined by conventional carbon bleaching and then passing it through an ion exchange column in a conventional manner. The beta cyclodextrin was then crystallized out of solution over a two day period. The solution prior to crystallization contained about 10–15% beta cyclodextrin. The crystallized beta cyclodextrin was removed from solution by filtration. The filter cake was then washed and dried.

The dried beta cyclodextrin crystals, in an amount of 300 gm, were subsequently placed in a 1 liter container of a jacketed heating vessel equipped with an agitator. The agitator had a shaft with two 45° angle blades on the shaft. The vessel was operated at 210° C. and the beta cyclodextrin crystals were maintained at 188° C.

After the two hour period, the contents of the pot were removed and spread on paper at ambient conditions to cool.

To separate the branched beta cyclodextrin from the rest, the cooled contents were used to make up a 10% aqueous solution, which was layered with toluene (2% of total volume) and held for about three days. The mixture was then filtered and the filtrate was evaporated and dried to recover a mixture of branched and non-branched beta cyclodextrins. This mixture contained between 30 to 40% by weight branched beta cyclodextrin.

To purify the mixture it was passed through a column packed with Dowex 1×2 resin onto which a beta cyclodextrin inclusion compound, benzoate, had been bound. The column was eluted with water from which the branched beta cyclodextrin was sequentially and separately eluted from acyclic and beta cyclodextrin. This dried filtrate contained about 80% by weight branched beta cyclodextrin.

EXAMPLE 2

Crystallized beta cyclodextrin obtained from potato starch in a conventional manner was washed and dried in a forced air oven at 155° F. Dried, crystalline beta cyclodextrin, 110.9 gms, at 5.2% moisture, was placed in a 1 liter stainless steel beaker and stirred at 250 rpm. This is the same device as used in Example 1 above. The jacket was maintained at 412° F. while the beta cyclodextrin equilibrated at about 370° F. The beta cyclodextrin was held in the jacketed vessel at 370° F. for about two hours after which time it was removed and allowed to cool in ambient conditions.

Analysis of the product obtained, 95.6 gms, showed 10.2% branched beta cyclodextrin, 16.2% acyclic carbohydrates, and 73.6% unbranched beta cyclodextrin. Thus, of the reacted product, 38.7% was transformed into branched beta cyclodextrin.

EXAMPLE 3

This example illustrates four different temperatures for conversion using the method of the present invention. Table A below lists the parameters of the various runs. Each run was conducted using the apparatus of Example 1.

TABLE A

|  | Run 1 | Run 2 | Run 3 | Run 4 |
|---|---|---|---|---|
| Dry Beta cyclodextrin initial (g) | 112 | 113.4 | 106.4 | 105.1 |
| Moisture beta cyclodextrin initial (%) | 0 | 0 | 5.2 | 5.2 |
| Degraded beta cyclodextrin during heating (g) | 8.1 | 30.0 | 32.4 | 25.2 |
| Beta cyclodextrin final (g) | 102.2 | 66.8 | 65.7 | 70.4 |
| Branched beta cyclodextrin final (g) | 3.3 | 11.8 | 7.1 | 9.8 |
| Acyclic final (g) | 4.8 | 18.2 | 25.3 | 15.4 |
| Lost (g) | 1.7 | 16.6 | 8.3 | 9.5 |
| 100-% beta cyclodextrin (product) | 7.3 | 31.0 | 33.0 | 26.4 |
| Temp. - Time | 20 min. at 166° C. 90 min. at 178° C. | 45 min. at 178° C. 95 min. at 191° C. | 120 min. at 193° C. | 120 min. at 188° |
| Total Time | 110 min. | 140 min. | 120 min. | 120 min. |
| % Formed of Branched beta cyclodextrin | 2.99 | 12.16 | 7.23 | 10.21 |
| % converted to Branched beta cyclodextrin | 40.74 | 39.22 | 21.90 | 38.69 |
| Rate of conversion* | 0.0664 | 0.2215 | 0.2750 | 0.2200 |

*(100-% beta cyclodextrin (product))/Total time in minutes

As is evident good rates of conversion were obtained at higher temperatures, e.g. runs 2–4.

Alternatively, the pyrolysis can be carried out in the presence of a dilute mineral acid such as hydrochloric, sulfuric or nitric acid which is sprayed onto the dried, crystalline cyclodextrins prior to heating. Although this is advantageous in the conversion of starches to dextrins, this is not a preferred method for accomplishing the present invention.

As will be evident to one of skill in the art the method to produce branched cyclodextrins is similar in some respects to the production of dextrins from starch by pyrolysis.

It will be understood that the preferred embodiments of the present invention herein chosen for the purpose of illustration are intended to cover all changes and modifications of the preferred embodiments of the present invention which do not constitute a departure from the spirit and scope of the present invention.

What is claimed is:

1. A branched cyclodextrin produced by a process comprising the following steps:
   (a) heating dried, crystalline cyclodextrin which is substantially free of non-carbohydrate materials to a temperature between about 135° C. to about 220° C. to form a product containing branched cyclodextrin;
   (b) cooling the product containing branched cyclodextrin; and
   (c) separating the branched cyclodextrin from the product.

2. The branched cyclodextrin of claim 1 wherein the dried, crystalline cyclodextrin is beta cyclodextrin and the branched cyclodextrin is branched beta cyclodextrin.

3. The branched beta cyclodextrin of claim 2 wherein the dried, crystalline cyclodextrin has a moisture content equal to or less than about 15%.

4. The branched cyclodextrin of claim 1 wherein the cyclodextrin is washed prior to step (a) to remove substantially all non-carbohydrate material from the cyclodextrin.

5. The branched cyclodextrin of claim 1 wherein the dried, crystalline cyclodextrin has a moisture content equal to or less than about 15%.

6. The branched cyclodextrin of claim 1 wherein the dried, crystalline cyclodextrin substantially free of non-carbohydrate materials is recovered by washing and drying crystalline cyclodextrin.

7. The branched cyclodextrin of claim 1 wherein the dried, crystalline cyclodextrin is also free of acyclic dextrins.

8. The branched cyclodextrin of claim 2 wherein the cyclodextrin is washed prior to step (a) to remove substantially all non-carbohydrate material from the cyclodextrin.

9. The branched cyclodextrin of claim 2 wherein the dried, crystalline cyclodextrin substantially free of non-carbohydrate materials is recovered by washing and drying crystalline cyclodextrin.

10. The branched cyclodextrin of claim 3 wherein said dried, crystalline cyclodextrin is also free of acyclic dextrins.

11. A branched cyclodextrin wherein not all of the bonds between the branches and the cyclodextrin ring are alpha-1,6 bonds.

12. The branched cyclodextrin of claim 11 wherein the cyclodextrin is beta cyclodextrin.

13. A branched cyclodextrin comprising a cyclodextrin and a branch bonded to said cyclodextrin wherein said branch is a pyrolysate of said cyclodextrin.

14. The branched cyclodextrin of claim 13 wherein said cyclodextrin is beta cyclodextrin.

15. A branched cyclodextrin wherein one portion of the branch of said branched cyclodextrin is comprised of at least one anhydroglucose unit while the other portion comprises pyrolysates of anhydroglucose units.

16. The branched cyclodextrin of claim 15 wherein said cyclodextrin is beta cyclodextrin.

17. A branched cyclodextrin produced by a process comprising the following steps:
   (a) heating dried, crystalline cyclodextrin which is substantially free of non-carbohydrate materials to a temperature of about 135-220° C. and for a time sufficient to form a product containing branched cyclodextrin;
   (b) cooling the product containing branched cyclodextrin; and
   (c) separating the branched cyclodextrin from the product.

18. The branched cyclodextrin of claim 17 wherein the dried, crystalline cyclodextrin is beta cyclodextrin and the branched cyclodextrin is branched beta cyclodextrin.

19. The branched beta cyclodextrin of claim 18 wherein the dried, crystalline cyclodextrin has a moisture content equal to or less than about 15%.

20. The branched cyclodextrin of claim 17 wherein the cyclodextrin is washed prior to step (a) to remove substantially all non-carbohydrate material from the cyclodextrin.

21. The branched cyclodextrin of claim 17 wherein the dried, crystalline cyclodextrin has a moisture content equal to or less than about 15%.

22. The branched cyclodextrin of claim 17 wherein the dried, crystalline cyclodextrin substantially free of non-carbohydrate materials is recovered by washing and drying crystalline cyclodextrin.

23. The branched cyclodextrin of claim 17 wherein the dried, crystalline cyclodextrin is also free of acyclic dextrins.

24. The branched cyclodextrin of claim 18 wherein the cyclodextrin is washed prior to step (a) to remove substantially all non-carbohydrate material from the cyclodextrin.

25. The branched cyclodextrin of claim 18 wherein the dried, crystalline cyclodextrin substantially free of non-carbohydrate materials is recovered by washing and drying crystalline cyclodextrin.

26. The branched cyclodextrin of claim 19 wherein said dried, crystalline cyclodextrin is also free of acyclic dextrins.

27. The branched cyclodextrin of claim 1 wherein the cyclodextrin is heated in the presence of a dilute mineral acid.

28. The branched cyclodextrin of claim 27 wherein the dilute mineral acid is selected from the group consisting of hydrochloric acid, sulfuric acid and nitric acid.

29. The branched cyclodextrin of claim 27 wherein the dilute mineral acid is sprayed onto the dried, crystalline cyclodextrin prior to heating.

30. The branched cyclodextrin of claim 17 wherein the cyclodextrin is heated in the presence of a dilute mineral acid.

31. The branched cyclodextrin of claim 30 wherein the dilute mineral acid is selected from the group consisting of hydrochloric acid, sulfuric acid and nitric acid.

32. The branched cyclodextrin of claim 30 wherein the dilute mineral acid is sprayed onto the dried, crystalline cyclodextrin prior to heating.

33. A method for making branched cyclodextrin comprising:
   (a) heating dried, crystalline cyclodextrin free of non-carbohydrate materials in the presence of a dilute mineral acid to a temperature between about 135° C. and about 220° C. to form a product containing branched cyclodextrin;
   (b) cooling the product containing branched cyclodextrin; and
   (c) separating the branched cyclodextrin from the product.

34. The method of claim 33 wherein the dilute mineral acid is selected from the group consisting of hydrochloric acid, sulfuric acid and nitric acid.

35. The method of claim 33 wherein the dilute mineral acid is sprayed onto the dried, crystalline cyclodextrin prior to heating.

* * * * *